US009253162B2

(12) United States Patent
Lu et al.

(10) Patent No.: US 9,253,162 B2
(45) Date of Patent: Feb. 2, 2016

(54) INTELLIGENT CARD SECURE COMMUNICATION METHOD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd, Beijing (CN)

( * ) Notice: Subject to any disclaimer, the term of this patent is extended or adjusted under 35 U.S.C. 154(b) by 0 days.

(21) Appl. No.: 14/436,256

(22) PCT Filed: Jan. 7, 2014

(86) PCT No.: PCT/CN2014/070193
§ 371 (c)(1),
(2) Date: Apr. 16, 2015

(87) PCT Pub. No.: WO2014/114191
PCT Pub. Date: Jul. 31, 2014

(65) Prior Publication Data
US 2015/0350164 A1    Dec. 3, 2015

(30) Foreign Application Priority Data

Jan. 22, 2013    (CN) .......................... 2013 1 0023543

(51) Int. Cl.
*H04L 29/06* (2006.01)
*H04L 9/32* (2006.01)
(52) U.S. Cl.
CPC .............. *H04L 63/04* (2013.01); *H04L 9/3263* (2013.01); *H04L 63/0823* (2013.01)

(58) Field of Classification Search
CPC .... H04L 63/04; H04L 9/3263; H04L 63/0823
See application file for complete search history.

(56) References Cited

U.S. PATENT DOCUMENTS 5,307,411 A * 4/1994 Anvret .................... H04M 1/66
 380/30
6,003,014 A * 12/1999 Lee ....................... G06Q 20/105
 705/13

(Continued)

FOREIGN PATENT DOCUMENTS

| CN | 102377570 A | 3/2012 |
| CN | 102801705 A | 11/2012 |
| CN | 103095460 A | 5/2013 |

OTHER PUBLICATIONS

Hu et al., A new protection method of private key file in smart card, Oct. 2010, Third International Symposium on Information Processing (ISIP), pp. 228-232.*

(Continued)

*Primary Examiner* — Kenneth Chang
(74) *Attorney, Agent, or Firm* — Ohlandt, Greeley, Ruggiero & Perle, LLP

(57) ABSTRACT

The present invention relates to the field of information security. Disclosed is an intelligent card secure communication method, capable of preventing the communication data from being monitored or intercepted. The method of the present invention provides a card with a definitely secure communication mechanism, initiates a session for the two communication parties to authenticate each other, and to check the identification legitimacy of the other party and the integrity of communication data, and provides a security constraint for subsequent communication, thus improving communication security.

11 Claims, 3 Drawing Sheets

(56) References Cited

U.S. PATENT DOCUMENTS

| | | | | |
|---|---|---|---|---|
| 2002/0186838 | A1* | 12/2002 | Brandys | G06Q 20/341 380/30 |
| 2003/0115468 | A1* | 6/2003 | Aull | G06F 21/606 713/175 |
| 2003/0145205 | A1* | 7/2003 | Sarcanin | G06Q 20/02 713/172 |
| 2005/0138386 | A1* | 6/2005 | Le Saint | G06Q 20/38215 713/185 |
| 2006/0129848 | A1* | 6/2006 | Paksoy | G06F 21/78 713/193 |
| 2006/0208066 | A1* | 9/2006 | Finn | G06K 7/0004 235/380 |
| 2007/0180507 | A1* | 8/2007 | Lu | G06F 21/34 726/5 |
| 2010/0088518 | A1* | 4/2010 | Dottax | G06Q 20/341 713/175 |

OTHER PUBLICATIONS

International Search Report dated Apr. 3, 2014 corresponding to PCT/CN2014/070193, 13 pp.
International Written Opinion dated Apr. 3, 2014 corresponding to PCT/CN2014/070193, 6 pp.

* cited by examiner

INTELLIGENT CARD SECURE COMMUNICATION METHOD

FIELD

The present invention relates to information security field, more particularly relates to a method for secure communication of a smart card.

BACKGROUND

With rapid development of communication technology, information network is widely applied, and crimes of computer and network come up constantly. People protect the data of information network by using identity identification and encryption technology and smart card products are widely used as identify tools for user identity identification. Secure and effective using of smart card can implement encryption and decryption process in real time for data transferred in the network, so as to guarantee that the user can enjoy service provided by the information network with security, speediness and convenience.

For the security related to the information security communication field, technology of the present is not perfect and cannot avoid problem of communication data being monitored or intercepted.

SUMMARY

In order to solve problem in the conventional technology, the present invention provides a method for secure communication of smart card.

The technical solution of the present invention is a method for secure communication of smart card, which comprises:

S1 including powering up the smart card;

S2 including setting a security identifier and a security variate;

S3 including waiting for receiving a command and determining a type of a received command;

if the received command is a first command, setting an authentication method identifier as an external authentication identifier or a mutual authentication identifier, setting an authentication identifier of a certificate, obtaining an RSA public key reference and an RSA private key reference, setting a security environment management identifier, going back to step S3;

if the received command is a second command, determining whether both the security environment management identifier and the authentication identifier of the certificate are set, authenticating the certificate, setting the authentication identifier and going back to S3 if both the security environment management identifier and the authentication identifier of the certificate are set; reporting an error and going back to S2 if the security environment management identifier and the authentication identifier of the certificate are not both set;

if the received command is a third command, determining whether the authentication identifier of the certificate is set, sending the certificate to an external device of the smart card and going back to S3 if the authentication identifier of the certificate is set; returning to S2 if the authentication identifier of the certificate is not set;

if the received command is a fourth command, going to S4; if the received command is a fifth command, going to S5; if the received command is a sixth command, going to S6; if the received command is a seventh command, going to S7;

if the command is one of other commands, determining whether the command meets a preset condition, authenticating the command according to a safe level and a session key if the command meets the preset condition; performing corresponding operation after a successful authentication, going back to S3; otherwise, reporting an error if the command does not meet the preset condition;

S4 including determining whether a condition that the security environment management identifier is not set and the authentication identifier of the certificate is set is met; reporting an error and going back to S2 if the condition is met; decrypting the fourth command via a public key referenced by the RSA public key reference to obtain a decryption result; obtaining a TLV structure with a safe level from the decryption result, storing the safe level, establishing a session key, storing the session key, setting signature information and setting a session key establishing identifier, going back to S3;

S5 including determining whether the session key establishment identifier is set, generating a first random number, storing the first random number and sending the first random number to the external device of the smart card and setting an obtaining random number identifier if the session key establishment identifier is set; going back to S3; reporting an error and going back to S2 if the session key establishment identifier is not set;

S6 including determining whether the obtaining random number identifier is set, reporting an error and going back to step S2 if the obtaining random number identifier is not set; constructing a first data block containing the TLV structure with safe level, the session key, the first random number, performing an operation on the first data block with a first algorithm to obtain a first calculation result, constructing a second block data containing the first calculation result and the first algorithm, reading a signature result of the external device of the smart card in the sixth command, authenticating the signature result via a public key referenced by the RSA public key reference and the second data block; setting an external authentication identifier if the authentication is successful, determining whether an authentication method identifier is the external authentication identifier, setting the mutual authentication identifier if the authentication method identifier is the external authentication identifier, going back to S3; going back to S3 if the authentication method identifier is not the external authentication identifier; reporting error and going back to S2 if the authentication is not successful;

S7 including obtaining a second random number from the seventh command, storing the second random number, determining whether a condition that the authentication method identifier is external authentication identifier and the external authentication identifier is set is met, constructing a third data block containing the session key and the second random number if the condition that the authentication method identifier is external authentication identifier and the external authentication identifier is set is met, performing an operation on the third data block via the first algorithm to obtain a second calculation result; constructing a fourth data block containing the second calculation result and the first algorithm; encrypting the fourth data block via a private public key referenced by the RSA private key reference to obtain an encryption result, wherein the obtained encryption result is a first signature result, sending the first signature result to the external device of the smart card, setting the mutual authentication identifier, clearing the first random number and the second random number, going back to S3; going back to S2 if the condition that the authentication method identifier is external authentication identifier and the external authentication identifier is set is not met.

Setting the security identifier includes: resetting the security environment management identifier, setting the session security identifier being without a safe level, resetting the authentication identifier of the certificate, resetting the obtaining random number identifier, resetting the session key establishment identifier, resetting the external authentication identifier and resetting the mutual authentication identifier, setting the security variate includes: setting the RSA public key reference as a default RSA public key reference; setting the RSA private key reference as a default RSA private key reference; setting the first session key, the second session key, the third session key, the fourth session key and the fifth session key as a default value respectively.

Setting an authentication method identifier as an external authentication identifier or a mutual authentication identifier includes: setting the authentication method identifier as external authentication identifier if a value of a first preset byte of the first command is a first preset value; setting the authentication method identifier as mutual authentication identifier if the value of the first preset byte of the first command is a second preset value;

setting an authentication identifier of a certificate includes: resetting the authentication identifier of the certificate if a value of a third preset byte of the first command is a third preset value; setting authentication identifier of the certificate if the value of the third preset byte of the first command is a fourth preset value;

obtaining an RSA public key reference and an RSA private key reference includes:
  step a1 including determining whether a first TLV structure in a data field of the first command is a first preset structure;
  going to step a2 if the first TLV structure in the data field of the first command is the first preset structure; otherwise, reporting an error and going back to S2;
  step a2 including determining whether there is a TLV structure being a second preset structure in the data field;
  obtaining and storing the RSA public key reference if there is a TLV structure being a second preset structure in the data field; reporting an error and going back S2 if there is not a TLV structure being a second preset structure in the data field;
  step a3 including determining whether there is a TLV structure being a third preset structure in the data field;
  obtaining and storing RSA private key reference if there is a TLV structure being a third preset structure in the data field; reporting an error and going back to S2 if there is not a TLV structure being a third preset structure in the data field.

Obtaining and storing the RSA public key reference includes: obtaining the last two bytes of a first structure value and storing the last two bytes as the RSA public key reference if a value of the second preset structure is the first structure value; using the default RSA public key by the card if the value of the second preset structure is a second structure value;

obtaining and storing the RSA private key reference includes: obtaining the last two bytes of a third structure value and storing the last two bytes as the RSA private key reference if a value of a third preset structure is the third structure; using the default RSA private key reference by the card if the value of the third preset structure is a fourth structure.

After determining whether both the security environment management identifier and the authentication identifier of the certificate are set, the method further includes: determining whether the second command meets a first condition, using a public key authentication certificate referenced by the RSA public key to determine whether there is a certificate required to be authenticated if the second command meets the first condition, going back to S2 if there is a certificate required to be authenticated or setting the authentication identifier of the certificate if there is not a certificate required to be authenticated and going back to S3; going back to S2 if the second command does not meet the first condition.

That the second command meets the first condition includes: a value of a specified part of the second command equals to a fifth preset value;

determining whether there is a certificate required to be authenticated includes: there is not a certification required to be authenticated if a value of a fifth bit of a first byte of the second command is a ninth preset value; there is a certificate required to be authenticated if the value of the fifth bit of the first byte of the second command is not the ninth preset value.

Before decrypting the fourth command via the public key referenced by the RSA public key reference, the method further includes: determining whether a length of a data field of the fourth command equals to a modular length of the public key referenced by the RSA public key reference, decrypting the fourth command with the public key referenced by the RSA public key reference if the length of the data field of the fourth command equals to the modular length of the public key referenced by the RSA public key reference; otherwise, reporting an error and going back to S3;

after storing the safe level and before establishing the session key, the method further includes: determining whether the session key can be established, establish session key if the session key can be established; otherwise, reporting an error and going back to S3.

Determining whether the session key can be established includes:
  determining whether a condition that a value of a general tag of a control reference template equals to a seventh preset value, and there is a first TLV structure and a second TLV structure the length of which equals to a first preset length in the control reference template is met, the session key can be established if the condition is met; the session key cannot be established if the condition is not met; wherein the seventh preset value is a first tag or a second tag;
  establishing the session key includes: in the case that the value of the general tag of the control reference template is a first tag,
    if a Value in the TLV structure with a TAG being 95 is a first value, establishing a first session key;
    if the Value in the TLV structure with the TAG being 95 is a second value, establishing a second session key;
    if the Value in the TLV structure with the TAG being 95 is a third value, establishing the first session key and the second session key;
    in the case that the value of the general tag of the control reference template is a second tag,
    if the Value in the TLV structure with the TAG being 95 is a first value, establishing a third session key;
    if the Value in the TLV structure with the TAG being 95 is a second value, establishing a fourth session key;
    if the Value in the TLV structure with the TAG being 95 is a third value, establishing the third session key and the fourth session key;
    if the Value in the TLV structure with the TAG being 95 is a fourth value, establishing a fifth session key;
  after storing the session key and before setting signature information, the method further includes:
    determining whether the signature information is required to be set, setting signature if the signature information is required to be set; reporting an error and going back to S2 if the signature information is not required to be set.

Determining whether the session key can be established includes:

determining whether the condition that the value of the general tag of the control reference template equals to the seventh preset value and there is the first TLV structure and the second TLV structure the length of which equals to the first preset length in the control reference template is met, the session key can be established if the condition is met; otherwise, the session key can not be established;

determining whether the signature information is required to be set includes:

determining whether there is a third TLV structure in the that control reference template, wherein a value of TAG of third TLV structure equals to an eighth preset value and a length of TAG of third TLV structure equals to an second preset length; the signature information being required to be set if there is a third TLV structure in the that control reference template; otherwise, the signature information not being required to be set.

S4-S7 are replaced by S4'-S7',

S4', reporting an error and going back to S2;

S5', determining whether a condition that the security environment management identifier is not set and the authentication identifier of the certificate is set is met, reporting an error if the condition is met, going back to S2; otherwise, generating a first random number, storing the first random number and sending the first random number to an external device of the smart card and setting an obtaining random number identifier, going back to S3;

S6', determining whether a condition that the obtaining random number identifier is set, and a decryption result obtained by decrypting the data field of the sixth command with the public key referenced by the RSA public key reference is successfully authenticated is met, reporting an error and going back to S2 if the condition is not met; if the condition is met, obtaining a safe level from the decryption result and generating card confidential data, determining whether a control reference template of the decryption result meets a preset requirement, obtaining and storing confidential data of the external device of the smart card if the control reference template meets the preset requirement, generating a session key according to the card confidential data and the confidential data of the external device, generating signature information according to a specified byte of the confidential data of the external device and a specified byte of the card confidential data, setting a session key establishment identifier and setting an obtaining random number identifier; reporting an error and going back to S2 if the control reference template does not meet the preset requirement.

S7', obtaining the second random number from the seventh command, storing the second random number and determining whether a condition that the session key establishment identifier is set and the obtaining random number identifier is set is met, going back to S2 if the condition is not met; if the condition is met, obtaining a data field of the seventh command from the seventh command, constructing a third data block containing the card confidential data and the data field of the seventh command, performing operation on the third data block via the first algorithm to obtain an operation result, wherein the operation result is a second calculation result; constructing a fourth data block containing the card confidential data and the second calculation result; encrypting the fourth block via the private key referenced by the RSA private key reference to obtain an encryption result, wherein the encryption result is a first signature result; sending the first signature result to the external device of the smart card, setting the mutual authentication identifier, clearing the first random number and the second random number, going back S3.

Generating a session key according to the card confidential data and the confidential data of the external device includes performing exclusive OR operation on the confidential data of the external device and the card confidential data to obtain an exclusive OR operation result; setting a corresponding counting number according to a type of the session key required to be generated, splicing the exclusive operation result and the counting number orderly, performing an operation on an splicing result via a first algorithm to obtain a third calculation result, obtaining a preset byte data from the third calculation result and storing the preset byte data as the session key.

The advantages of the technical solution provided by the embodiments of the present invention are: by the method of the present invention, a security communication mechanism can be provided safely to a card; By initiating a session, the two parties of communication can authenticate with each other and one party can determine legitimate identity of the other party and the integrity of the other party, which provides safe restraint for subsequent communication so as to improve safety of communication.

DETAILED DESCRIPTION

The embodiment of the present invention provides a method for secure communication of smart card based on management of secure channels in a smart card. Details of the embodiment will be illustrated by combining drawings of the present invention.

Figure 1:
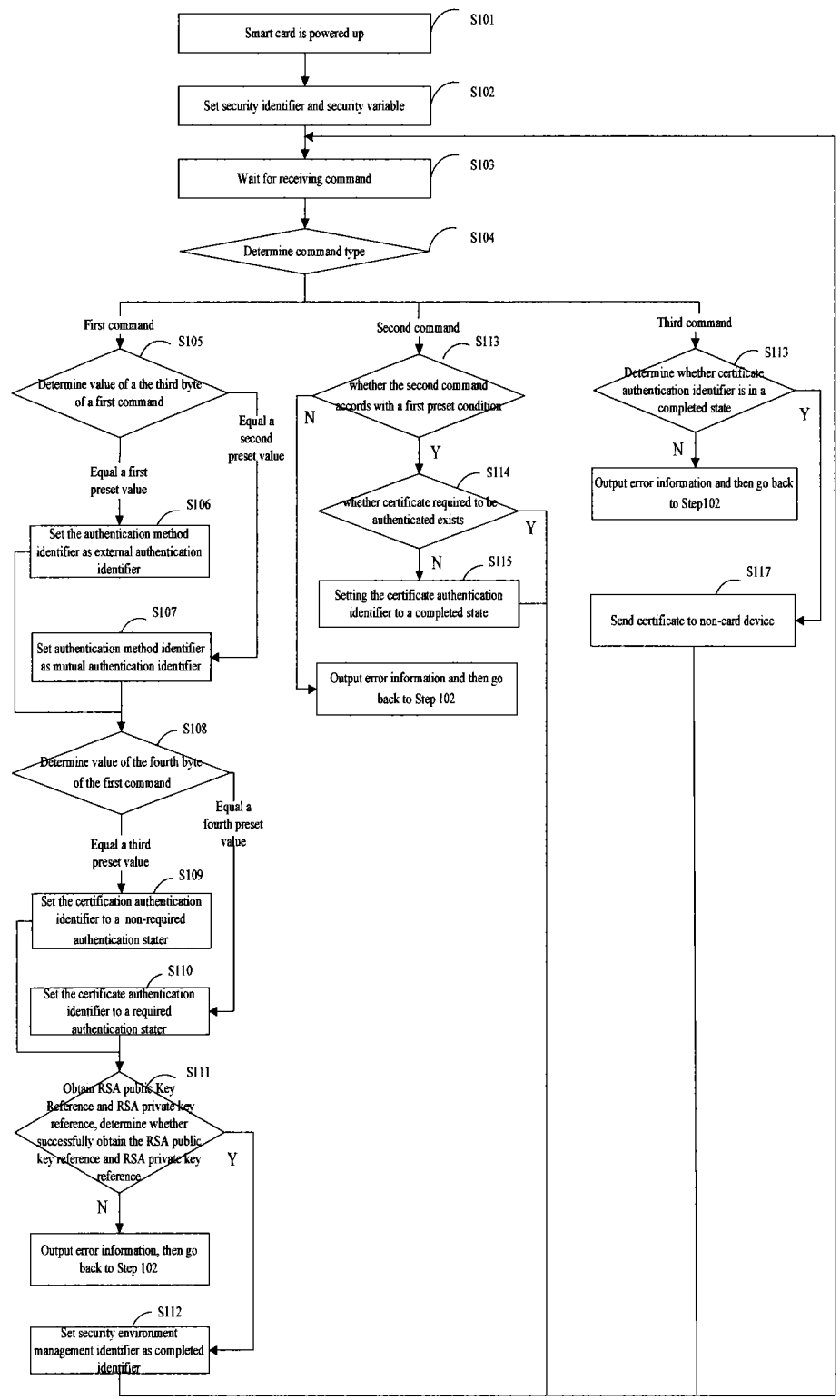
FIGS. 1-3 are flowcharts for secure communication of smart card provided by an embodiment of the present invention.
Figure 2:
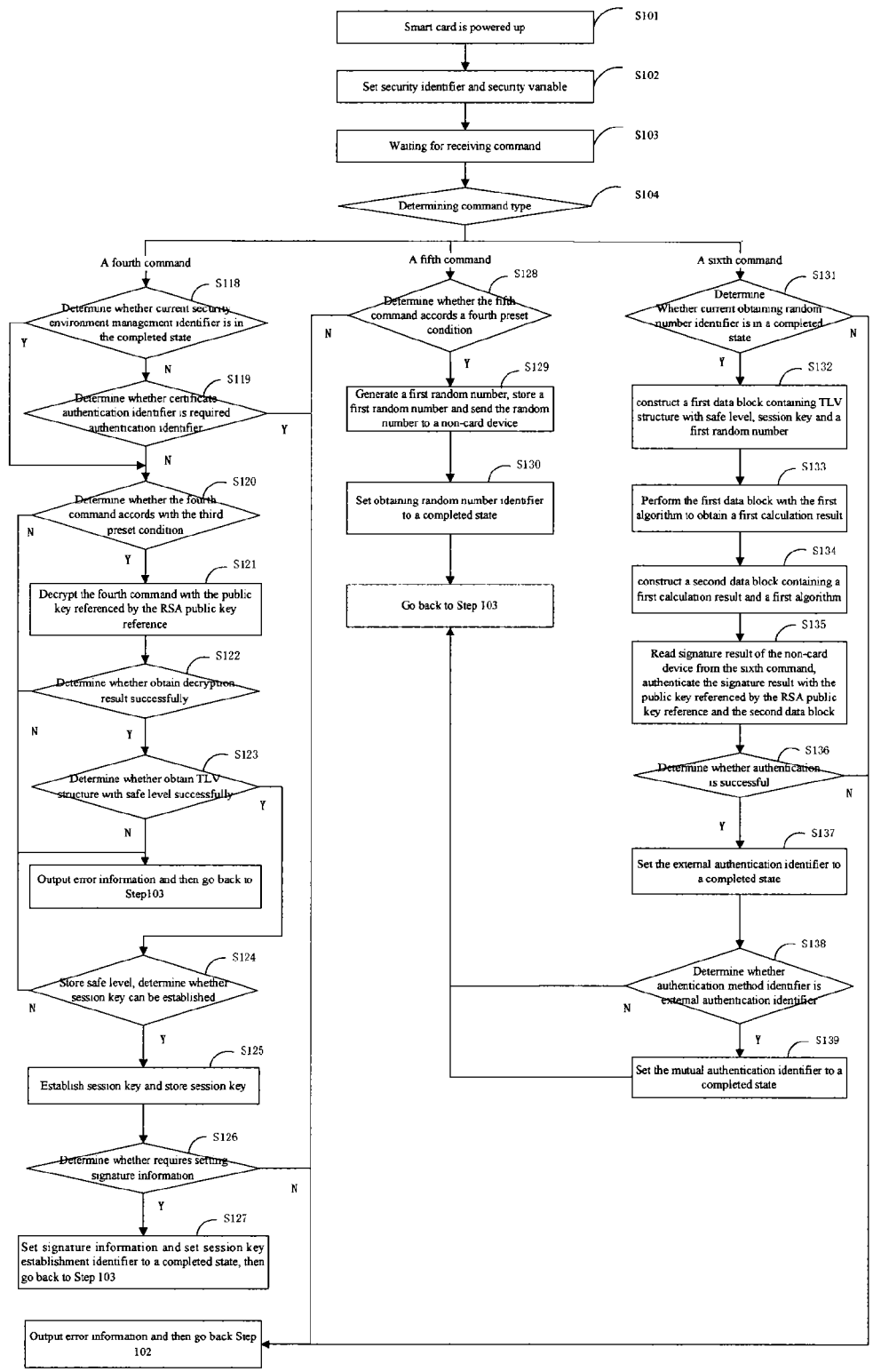
Figure 3:
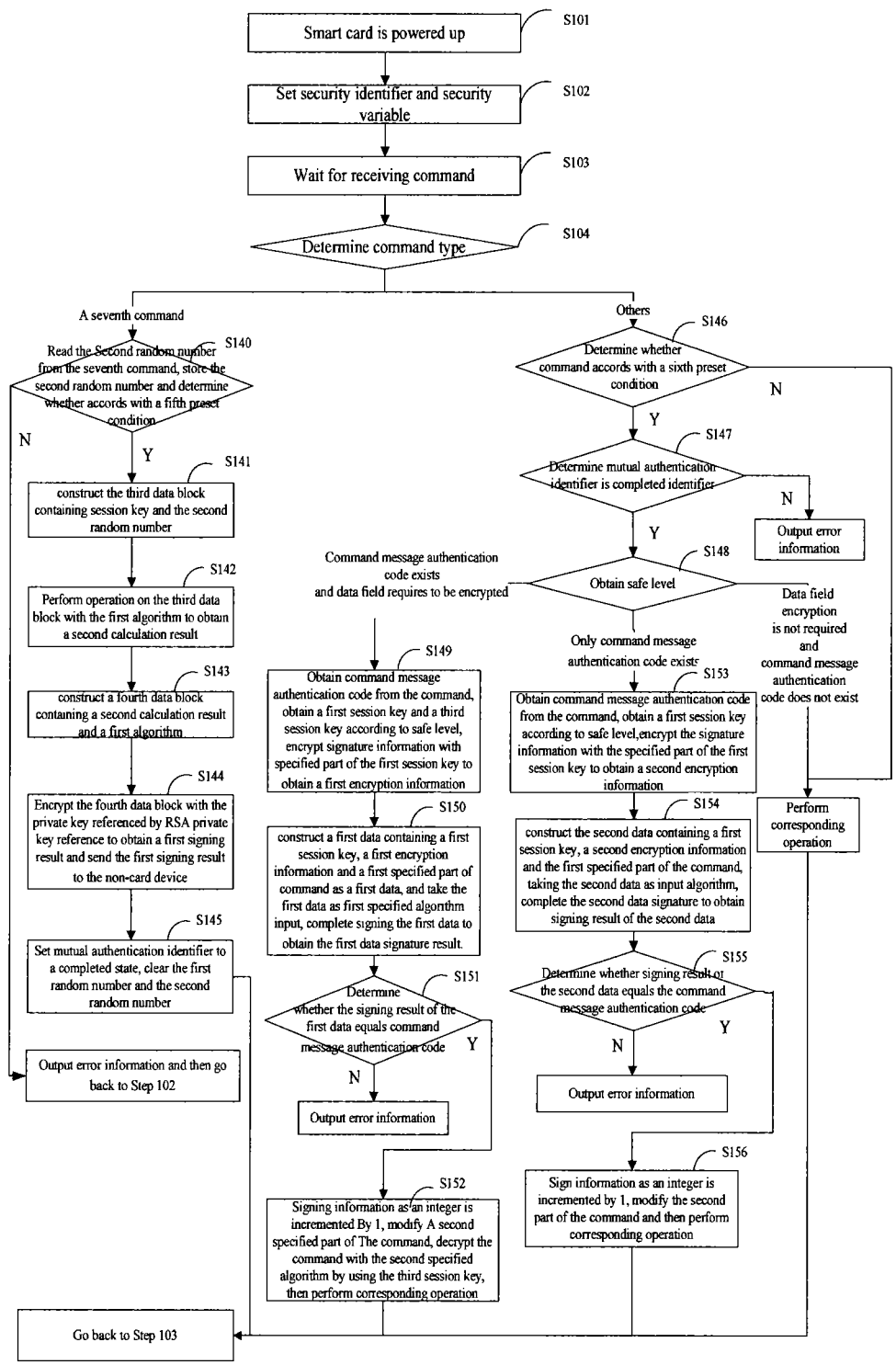

Referring to FIGS. 1-3, an embodiment of a method for secure communication of smart card is provided. The method includes step 101 to step 112.

In step 101, a smart card is powered up.

In step 102, a security identifier and a security variate are set.

In the embodiment, the secure identifier may be set by: setting a security environment management identifier to an uncompleted state, setting an initial state of a session security identifier as an identifier without a safe level, setting a completing certification authentication identifier to an uncompleted state, setting an obtaining random number identifier to an uncompleted state, setting a session key identifier to an un-established state, setting an external authentication identifier to an un-completed state and setting a mutual authentication identifier to an un-completed state.

In the embodiment, the security variate may be set by: setting a RSA public key reference as PKV1 (Public Key Version 1), PKI1 (Public Key Index 1); setting a RSA private key reference as SKV1 (Secret Key Version 1), SKI1 (Secret Key Index); setting a first session key, a second session key, a third session key, a fourth session key and a fifth session key as an initial value which can be '00' of 16 bytes; setting signature information as an initial value which can be '00' of 8 bytes. Preferably, the first session key is CMAC (Command Message Authentication Code) session key, the second session key is RMAC (Response Message Authentication Code) session key, the third session key is CENC(Command Encryption) session key, the fourth session key is RENC (Response Encryption) session key and the fifth session key is DEK (Data Encryption Key) session key.

In step 103, a command is waited to be received.

In the embodiment, the command includes a first command, a second command, a third command, a fourth command, a fifth command, a sixth command, a seventh command and other commands.

Preferably, the first command is a command of security environment management, the second command is a command of executing a security operating certificate authentication, the third command is a command of obtaining a certificate, the fourth command is a command of executing a security operating decryption, the fifth command is a command of obtaining a random number, the sixth command is a command of an external authentication, the seventh command is a command of an internal authentication.

In step 104, a type of the received command is determined.

In the embodiment, the type of the received command is determined according to a value from a second byte to a fourth byte of the command, which includes:

if the value from the second byte to the fourth byte of the command is 2281A4 or 22C1A4 or 2281B6 or 22C1B6, the command is the first command; going to step 105;

if the value from the second byte to the fourth byte in the command is 2A00AE or 2A00BE, the command is the second command; step 113 is executed;

if the value from the second byte to the fourth byte in the command is CA7F21 or CB7F21, the command is the third command, step 116 is executed;

if the value from the second byte to the fourth byte in the command is 2A8084, the command is the fourth command, step 118 is executed;

if the value from the second byte to the fourth byte in the command is 840000, the command is the fifth command, step 128 is executed;

if the value from the second byte to the fourth byte in the command is 820000, the command is the sixth command, step 131 is executed;

if the value from the second byte to the fourth byte is 880000, the command is the seventh command, step 140 is executed;

if the command is one of other commands, step 146 is executed.

In step 105, a value of a third byte of the first command is determined; if the value is equal to a first preset value, step 106 is executed; if the value is equal to a second preset value, step 107 is executed.

In the embodiment, preferably, the first preset value is 81, the second preset value is C1.

In step 106, an authentication method identifier is set as an external authentication identifier, step 108 is executed.

In step 107, the authentication method identifier is set as a mutual authentication identifier.

In step 108, a value of the fourth byte in the first command is determined, if the value is equal to a third preset value, step 109 is executed; if the value is equal to the fourth preset value, step 110 is executed.

In the embodiment, preferably, the third preset value is A4; the fourth preset value is B6.

In step 109, an authentication identifier of a certificate is set to a non-required authentication state, step 111 is executed;

In step 110, the authentication identifier of a certificate is set to a required authentication state.

In step 111, a RSA public key reference and a RSA private key reference are obtained and determine whether the RSA public key reference and the RSA private key reference are successfully obtained; step 112 is executed if the RSA public key reference and the RSA private key reference are successfully obtained; error information is output, and step 102 is executed.

In the embodiment, the RSA public key reference and the RSA private key reference are obtained via step a1 to step a3.

In step a1, whether a first TLV structure in a data field meets a first preset structure is determined; step a2 is executed if the first TLV structure in the data field meets the first preset structure; error information is output and step 102 is executed if the first TLV structure in the data field does not meet the first preset structure.

The first preset structure may be 80021002.

In step a2, whether a TLV structure in the data field meets a second preset structure is determined; the RSA public key reference is obtained if the TLV structure in the data field meets the second preset structure; error information is output and step 102 is executed if the TLV structure in the data field does not meet the second preset structure.

The second preset structure may be 8302N1N2 or 8300.

In the case that the second preset structure is 8302N1N2, N1 and N2 are obtained and stored as the RSA public key reference, where N1 indicates an RSA public key version number and N2 indicates an RSA public key index number.

In the case that the second preset structure is 8300, the default RSA public key reference of PKV1 and PKI1 are used by the smart card, where PKV1 indicates an RSA public key version number and PKI1 indicates an RSA public key index number.

In step a3, whether a TLV structure in the data field meets a third preset structure is determined; the RSA private key reference is obtained if the TLV structure in the data field meets the third preset structure; error information is output and step 102 is executed if the TLV structure in the data field does not meet the third preset structure.

The third preset structure may be 8402N3N4 or 8400.

In the case that the third preset structure is 8402N3N4, N3 and N4 are obtained and stored as the RSA private key reference, where N3 indicates a private key version number, N4 indicates a private key index number.

In the case that the third preset structure is 8400, the default RSA private key reference of SKV1 and SKI1 are used by the smart card, where SKV1 indicates a private key version number, SKI1 indicates a default private key index number.

In step 112, the security environment identifier is set to a completed state, step 103 is executed.

Step 113 to step 115 are executed if the second command is received.

In step 113, whether the second command meets a first preset condition is determined, step 114 is executed if the second command meets the first preset condition; error information is output and step 102 is executed if the second command does not meet the first preset condition.

In the embodiment, specifically, determine whether the second command meets the following conditions:

1) security environment management identifier is in the completed state;

2) authentication identifier of the certificate is in the required authentication state;

3) the value of a specified part of the second command is equal to a fifth preset value, where the specified part in the second command is TAG (a certificate tag) part of the TLV structure, the fifth preset value may be 7F21;

4) the certificate is successfully authenticated by using the public key referenced by the RSA public key reference.

If all of the conditions above are met, it's determined that the second command meets the first preset condition; otherwise, it's determined that the second command does not meet the first preset condition.

In step 114, whether there is a certificate required to be authenticated is determined; step 103 is executed if there is a certificate required to be authenticated; otherwise, step 115 is executed.

In the embodiment, whether there is a certificate required to be authenticated is determined according to a value of a fifth bit of a first byte in the second command. If the value of the fifth bit of the first byte in the second command is not equal to 0, it's indicated that there is a certificate required to be authenticated; if the value of the fifth bit of the first byte in the second command is equal to 0, it's indicated that there is not a certificate required to be authenticated.

In step 115, the authentication identifier of the certificate is set to a completed state and step 103 is executed.

Step 116 to step 117 are executed if the third command is received.

In step 116, whether the authentication identifier of the certificate is in a completed state is determined; if the authentication identifier of the certificate is in a completed state, step 117 is executed; otherwise, error information is output and step 102 is executed.

In step 117, the certificate is sent to the external device of the smart card and step 103 is executed.

In the embodiment, the certificate stored in the security field of the smart card is sent to the external device of the smart card.

As shown in FIGS. 1-2, step 118 to step 127 are executed if the fourth command is received.

In step 118, whether the security environment management identifier is in the completed state is determined; if the security environment management identifier is in the completed state, step 120 is executed; otherwise, step 119 is executed.

In step 119, whether the authentication identifier of the certificate is in the required authentication state is determined; if the authentication identifier of the certificate is in the required authentication state, error information is output and step 102 is executed; if the authentication identifier of the certificate is not in the required authentication state, step 120 is executed.

In step 120, whether the fourth command meets a third preset condition is determined; if the fourth command meets the third preset condition, step 121 is executed; if the fourth command does not meet the third preset condition, error information is output and step 103 is executed.

In the embodiment, the fourth command meets the third preset condition if a length of the data field of the fourth command equals to a modular length of the public key referenced by the RSA public key reference; otherwise, the fourth command does not meet the third preset condition.

In step 121, the fourth command is decrypted by using the public key referenced by the RSA public key reference.

In the embodiment, specifically, the public key referenced by the RSA public key is used to decrypt the data field of the fourth command via a preset way.

In step 122, whether a decryption result is obtained successfully is determined; if yes, step 123 is executed; if no, error information is output and step 103 is executed.

In the embodiment, if a value from a first byte to a second byte of the decryption result equals to a sixth preset value, correct decryption result is obtained. Preferably, the sixth preset value is 0002.

In step 123, whether a TLV structure with a safe level is obtained successfully is determined; if yes, step 125 is executed; otherwise error information is output and step 103 is executed.

In the embodiment, the TLV structure with the safe level is obtained from the decryption result. Whether the TLV structure with the safe level is obtained successfully is determined according to the value of the first two bytes of the TLV structure with the safe level. If the value of the first two bytes of TLV structure with the safe level is D301, it's indicated that the TLV structure with the safe level is successfully obtained; otherwise, it's indicated that the TLV structure with the safe level is unsuccessfully obtained.

In step 124, the safe level is stored and whether a session key can be established is determined; if the session key can be established is determined, step 125 is executed; otherwise, error information is output, and step 103 is executed.

In the embodiment, a value of a third byte of the TLV structure with safe level is stored as the safe level.

The session key can be established if a value of a general tag of a CRT control reference template equals to a seventh preset value, there is a first TLV structure in the control reference template and there is a second TLV structure, the length of which is equal to a first preset length, in the control reference template; otherwise, the session key can not be established.

Preferably, the seventh preset value is B4 or B8; the first TLV structure is a TLV structure, a value of the TAG of which equals to 95; the second TLV structure is a TLV structure, a value of the TAG of which equals to D1; the first preset length is 16.

In step 125, the session key is established and stored.

In the embodiment, a corresponding session key is established according to a value of the general tag of the CRT control reference template; in the case that the value of the general tag of CRT control reference template is B4, if a Value in TLV structure with a TAG being 95 is 10, D1 is established as a first session key of TLV structure data of TAG;

if the Value in TLV structure with a TAG being 95 is 20, D1 is established as a second session key of TLV structure data of TAG;

if the Value in TLV structure with a TAG being 95 is 30, D1 is established as the first session key and the second session key of TLV structure data of TAG if the Value in TLV structure with a TAG being 95 meets any one of the conditions above, it's indicated that the session key is established and stored successfully; otherwise, it's indicated that the session key is not established and stored successfully.

In the case that the value of the general tag of CRT control reference template is B8, if the Value in TLV structure with a TAG being 95 is 10, D1 is established as a third session key of TLV structure data of TAG;

if the Value in TLV structure with a TAG being 95 is 20, D1 is established as a fourth session key of TLV structure data of TAG;

if the Value in TLV structure with a TAG being 95 is 30, D1 is established as the third session key and the fourth session key of TLV structure data of TAG;

if the Value in TLV structure with a TAG being 95 is C0, D1 is established as the fifth session key of TLV structure data of TAG In step 126, whether the signature information is required to be set is determined; step 127 is executed if the signature information is required to be set; error information is output and step 102 is executed if the signature information is not required to be set.

In the embodiment, if there is a third TLV structure, of which the value of TAG equals to 91 and the length equals to a second preset length, in CRT control reference template, the signature information is required to be set. Preferably, the second preset length is 8.

In step 127, the signature information is set and the session key establishing identifier is set to a completed state, step 103 is executed.

In the embodiment, the signature information is set as data of 8 bytes, preferably, the data of 8 bytes may be '0000000000000000'.

Step 128 to step 130 are executed if the fifth command is received.

In step 128, whether the fifth command meets a fourth preset condition is determined; step 129 is executed if the fifth command meets a fourth preset condition; otherwise, error information is output, and step 102 is executed.

In the embodiment, if the session key establishment identifier is in a completed state, it's determined that the fifth command meets the fourth preset condition; otherwise, it's determined that the fifth command does not meet the fourth preset condition.

In step 129, a first random number is generated and stored, and the first random number is sent to an external device of the smart card.

In the embodiment, preferably, the first random number may be a random number with 16 bytes.

In step 130, the obtaining random number identifier is set to a completed state, and step 103 is executed.

Step 131 to step 139 are executed if the sixth command is received.

In step 131, whether the obtaining random number identifier is in a completed state is determined; step 132 is executed if the obtaining random number identifier is in the completed state; otherwise, error information is output, step 102 is executed.

In step 132, a first data block containing the TLV structure with safe level, the session key and the first random number is constructed.

In step 133, the first data block is operated via a first algorithm and a first calculating result is obtained.

In the present embodiment, preferably, the first algorithm may be an algorithm of SHA1.

In step 134, a second data block containing the first calculating result and the first algorithm is constructed.

In step 135, a signature result of the external device of the smart card is read from the sixth command and the signature result is verified via the public key referenced by the RSA public key reference and the second data block.

In step 136, whether the signature result is successfully verified is determined; step 137 is executed if the signature result is successfully verified; otherwise, error information is output and step 102 is executed.

In step 137, the external authentication identifier is set to a completed state.

In step 138, whether the authentication method identifier is the external authentication identifier; step 139 is executed if the authentication method identifier is the external authentication identifier; otherwise, step 103 is executed.

In step 139, the mutual authentication identifier is set to a completed state, and step 103 is executed.

As shown in FIG. 3, step 140 to step 145 are executed if the seventh command is received.

In step 140, a second random number is read from the seventh command, the second random number is stored and whether the seventh command meets a fifth preset condition is determined; step 141 is executed if the seventh command meets the fifth preset condition; otherwise, error information is output and step 102 is executed.

In the embodiment, the first 16 bytes in the seventh command are read as the second random number.

It's determined that whether the seventh command meets both the following conditions:
 1) the authentication method identifier is the external authentication identifier;
 2) the external authentication identifier is in a completed state.

If both of above conditions are met, it's determined that the seventh command meets the fifth preset condition; otherwise, it's determined that the seventh command does not meet the fifth preset condition.

In step 141, a third data block containing session key and the second random number is constructed.

In step 142, the third data block is operated via the first algorithm and a second calculation result is obtained.

In step 143, a fourth data block containing the second calculation result and the first algorithm is constructed.

In step 144, the fourth data block is encrypted with the private key referenced by the RSA public key reference and a first signature result is obtained and the first signature result is sent to the external device of the smart card.

In step 145, the mutual authentication identifier is set to a completed state, the first random number and the second random number are cleared; and step 103 is executed.

If the command is one of other commands, the following operations are executed.

In step 146, whether the command meets a sixth preset condition is determined; step 147 is executed if the command meets the sixth preset condition; a corresponding operation is operated if the command does not meet the sixth preset condition and step 103 is executed.

In the embodiment, if a value of a third bit in a first byte of the command equals to a preset value, it's determined that the command meets the sixth preset condition; otherwise, the command does not meet the sixth preset condition. Preferably, the preset value is 0.

In step 147, whether the mutual authentication identifier is in a completed state; step 148 is executed if the mutual authentication identifier is in the completed state; otherwise, error information is output.

In step 148, the safe level is obtained, step 149 is executed if the safe level indicates that there is a command message authentication code and the data field is required to be encrypted; step 153 is executed if the safe level only indicates that there is the command message authentication code; a corresponding operation is performed and step 103 is executed if the safe level indicates that there is not a command message authentication code and the data field is not required to be encrypted.

In step 149, command message authentication code is obtained from the command, a first session key and a third session key is obtained according to the safe level, signature information is encrypted via a specified part of the first session key and first encryption information is obtained.

In the embodiment, the command message authentication code is obtained from the specified TLV structure of the command. The specified part of the first session key is the first 8 bytes of the first session key.

In step 150, a first data containing the first session key, the first encryption information and the first specified part of the command is constructed, the first data is taken as an input of a first specified algorithm so as to complete a first data signature to obtain a first data signature result.

In the embodiment, the first specified part of the command is the data before the specified TLV structure and the data in the specified TLV structure. Preferably, the first specified algorithm is ISO9797M2_ALG3.

In step 151, whether the first data signature result equals to a command message authentication code is determined; step 152 is executed if the first data signature result equals to the command message authentication code; error information is output if the first data signature result does not equal to the command message authentication code.

In step 152, the signature information as an integer is incremented by 1, the second specified part of the command is modified, decrypt the third specified part of the command via a second specified algorithm applied by the third session key and a corresponding operation is performed; step 103 is executed.

In the embodiment, the second specified part is the length of the data field of the command. Preferably, the second specified algorithm is ISO9797M2. For example, the data in 87L01XX in the data field of the command is decrypted.

In step 153, a command message authentication code is obtained from the command, the first session key is obtained according to the safe level, the signature information encrypt via the specified part of the first session key to obtain second encryption information.

In step 154, a second data containing the first session key, the second encryption information and the first specified part of the command is constructed, the second data is taken as the input of the first specified algorithm, signature of the second data is completed to obtain a signature result of the second data.

In step 155, whether the signature result of the second data equals to the command message authentication code is determined; step 156 is executed if the signature result of the second data equals to the command message authentication code; error information is output if the signature result of the second data does not equal to the command message authentication code.

In step 156, signature information as an integer is incremented by 1; the second specified part of the command is modified; and a corresponding operation is performed.

It should be noted that, in the embodiment of the present invention, steps 118 to 127 are replaced with step of outputting error information and then going back to step 102; step 128 is replaced with step 128', steps 131 to 134 are replaced with steps 131' to 134'; steps 135 to 139 are replaced by setting the session key establishing identifier and obtaining random number identifier to completed states, going back to step 103; steps 140 to 141 are replaced with steps 140' to 141'; step 143 is replaced with step 143'.

In step 128', safe environment managing identifier and authentication identifier of the certificate are determined; an error is reported if the safe environment managing identifier is in an uncompleted state and the authentication identifier of the certificate is in required authentication state; otherwise, steps 129 to 130 are executed.

In step 131', whether the sixth command meets a preset condition is determined; specifically, whether following conditions are met are determined: obtaining random number identifier being in a completed state; the encryption result obtained by decrypting the data field of the sixth command by the public key referenced by RSA public key reference being successfully authenticated; step 132' is executed if the conditions are met; otherwise, an error is reported and step 102 is executed.

In step 132', the safe level is obtained from the encryption result and card confidential data is generated; where the card confidential data may be a random number with 32 bytes.

In step 133', whether the CRT control reference template of the decryption result meets a preset requirement is determined; step 134' is executed if the CRT control reference template of the decryption result meets the preset requirement; otherwise, error information is output, step 102 is executed. The preset requirement is that the general TAG is 0xB4 or 0xB8; the next TLV is 9501XX, existed TLV is 80LXX and the value of L is 0 OR 1; the existed TLV is D1LXX and the value of L is 0; the existed TLV is 91LXX and the value of L is 0.

In step 134', confidential data of the external device of the smart card is obtained and stored, a session key is generated according to the card confidential data and the confidential data of the external device of the smart card, the confidential data of the external device of the smart card and the first 4 bytes of the card confidential data are spliced, the spliced result is stored as signature information.

In the embodiment, that the session key is generated according to the card confidential data and the confidential data of the external device of the smart card specifically includes: an exclusive OR operation is carried on the confidential data of the external device of the smart card and the card confidential data to obtain an exclusive OR operation result, accounting number with 32 bytes is set according to a type of the session key that needs to be generated, the exclusive OR operation result and the counting number is spliced orderly and a SHA1 operation is made on the spliced result to obtain a third calculation result, the first 16 bytes of the third calculation result is obtained and the first 16 bytes is stored as the session key.

In the case that the counting number is set as 1, the session key generated is a first session key; in the case that the counting number is set as 2, the session key generated is a second session key; in the case that the counting number is set as 3, the session key generated is a third session key; in the case that the counting number is set as 4, the session key generated is a fourth session key; in the case that the counting number is set as 5, the session key generated is a fifth session key.

In step 140', whether the condition that the session key establish identifier is in a completed state and the obtaining random number identifier is in a completed state is met is determined, step 141' is executed if the condition is met; an error is reported and step 102 is executed if the condition is not met.

In step 141', a data field of the seventh command is obtained from the seventh command, a third data block containing card confidential data and the data field of the seventh command is constructed; then step 142 is executed.

In step 143', a fourth data block containing card confidential data and the second calculation result is constructed; steps 144 to 145 are executed.

The embodiment above can also implement the purpose of the present invention.

The described embodiments are only preferred embodiments of the invention and the embodiments are not intended to limit the invention. Any alteration or change easily obtained by those skilled in the art based on the invention should fall in the scope of protection of the invention. Therefore, the invention intends to protect what is claimed in claims.

The invention claimed is:
1. A method for safe communication of a smart card comprising:
S1 comprising powering up the smart card;
S2 comprising setting a security identifier and a security variate;
S3 comprising waiting for receiving a command and determining a type of a received command;
setting an authentication method identifier as an external authentication identifier or a mutual authentication identifier, setting an authentication identifier of a certificate, obtaining an RSA public key reference and an RSA private key reference, setting a security environment management identifier, going back to step S3 if the received command is a first command;
determining whether both the security environment management identifier and the authentication identifier of the certificate are set if the received command is a second command, authenticating the certificate, setting the authentication identifier and going back to S3 if both the security environment management identifier and the authentication identifier of the certificate are set; reporting an error and going back to S2 if the security environment management identifier and the authentication identifier of the certificate are not both set;
determining whether the authentication identifier of the certificate is set if the received command is a third command, sending the certificate to an external device of the smart card and going back to S3 if the authentication identifier of the certificate is set; reporting an error and returning to S2 if the authentication identifier of the certificate is not set;
if the received command is a fourth command, going to S4; if the received command is a fifth command, going to S5; if the received command is a sixth command, going to S6; if the received command is a seventh command, going to S7;
determining whether the command meets a preset condition if the command is one of other commands, authenticating the command according to a safe level and a session key if the command meets the preset condition; performing corresponding operation after a successful authentication, going back to S3; otherwise, reporting an error if the command does not meet the preset condition;
S4 comprising determining whether a condition that the security environment management identifier is not set and the authentication identifier of the certificate is set is met; reporting an error and going back to S2 if the condition is met; decrypting the fourth command via a public key referenced by the RSA public key reference to obtain a decryption result; obtaining a TLV structure with a safe level from the decryption result, storing the safe level, establishing a session key, storing the session key, setting signature information and setting a session key establishing identifier, going back to S3;
S5 comprising determining whether the session key establishment identifier is set, generating a first random number, storing the first random number and sending the first random number to the external device of the smart card and setting an obtaining random number identifier if the session key establishment identifier is set; going back to S3; reporting an error and going back to S2 if the session key establishment identifier is not set;
S6 comprising determining whether the obtaining random number identifier is set, reporting an error and going back to step S2 if the obtaining random number identifier is not set; constructing a first data block containing the TLV structure with safe level, the session key, the first random number, performing an operation on the first data block with a first algorithm to obtain a first calculation result, constructing a second block data containing the first calculation result and the first algorithm, reading a signature result of the external device of the smart card in the sixth command, authenticating the signature result via a public key referenced by the RSA public key reference and the second data block; setting an external authentication identifier if the authentication is successful, determining whether an authentication method identifier is the external authentication identifier, setting the mutual authentication identifier if the authentication method identifier is the external authentication identifier, going back to S3; going back to S3 if the authentication method identifier is not the external authentication identifier; reporting error and going back to S2 if the authentication is not successful;
S7 comprising obtaining a second random number from the seventh command, storing the second random number, determining whether a condition that the authentication method identifier is the external authentication identifier and the external authentication identifier is set is met, constructing a third data block containing the session key and the second random number if the condition that the authentication method identifier is the external authentication identifier and the external authentication identifier is set is met, performing an operation on the third data block via the first algorithm to obtain a second calculation result; constructing a fourth data block containing the second calculation result and the first algorithm; encrypting the fourth data block via a private key referenced by the RSA private key reference to obtain an encryption result, wherein the obtained encryption result is a first signature result, sending the first signature result to the external device of the smart card, setting the mutual authentication identifier, clearing the first random number and the second random number, going back to S3; going back to S2 if the condition that the authentication method identifier is the external authentication identifier and the external authentication identifier is set is not met.

2. The method of claim 1, wherein
setting the security identifier comprises: resetting the security environment management identifier, setting the session security identifier being without a safe level, resetting the authentication identifier of the certificate, resetting the obtaining random number identifier, resetting the session key establishment identifier, resetting the external authentication identifier and resetting the mutual authentication identifier,
setting the security variate comprises: setting the RSA public key reference as a default RSA public key reference; setting the RSA private key reference as a default RSA private key reference; setting the first session key, the second session key, the third session key, the fourth session key and the fifth session key as a default value respectively.

3. The method of claim 1, wherein
setting an authentication method identifier as an external authentication identifier or a mutual authentication identifier comprises:
setting the authentication method identifier as an external authentication identifier if a value of a first preset byte of the first command is a first preset value; setting the authentication method identifier as a mutual authentication identifier if the value of the first preset byte of the first command is a second preset value;

setting an authentication identifier of a certificate comprises:
resetting the authentication identifier of the certificate if a value of a third preset byte of the first command is a third preset value; setting authentication identifier of the certificate if the value of the third preset byte of the first command is a fourth preset value;

obtaining an RSA public key reference and an RSA private key reference comprises:
step a1 comprising determining whether a first TLV structure in a data field of the first command is a first preset structure;
going to step a2 if the first TLV structure in the data field of the first command is the first preset structure; otherwise, reporting an error and going back to S2;
step a2 comprising determining whether there is a TLV structure being a second preset structure in the data field;
obtaining and storing the RSA public key reference if there is a TLV structure being a second preset structure in the data field; reporting an error and going back S2 if there is not a TLV structure being a second preset structure in the data field;
step a3 comprising determining whether there is a TLV structure being a third preset structure in the data field;
obtaining and storing RSA private key reference if there is a TLV structure being a third preset structure in the data field; reporting an error and going back to S2 if there is not a TLV structure being a third preset structure in the data field.

4. The method of claim 3, wherein,
obtaining and storing the RSA public key reference comprises:
obtaining the last two bytes of a first structure value and storing the last two bytes as the RSA public key reference if a value of the second preset structure is the first structure value; using the default RSA public key reference by the card if the value of the second preset structure is a second structure value;
obtaining and storing the RSA private key reference comprises:
obtaining the last two bytes of a third structure value and storing the last two bytes as the RSA private key reference if a value of a third preset structure is the third structure; using the default RSA private key reference by the card if the value of the third preset structure is a fourth structure.

5. The method of claim 1, wherein
after determining whether both the security environment management identifier and the authentication identifier of the certificate are set, the method further comprises:
determining whether the second command meets a first condition, using a public key authentication certificate referenced by the RSA public key reference to determine whether there is a certificate required to be authenticated if the second command meets the first condition, going back to S2 if there is a certificate required to be authenticated or setting the authentication identifier of the certificate if there is not a certificate required to be authenticated and going back to S3; reporting an error and going back to S2 if the second command does not meet the first condition.

6. The method of claim 5, wherein
that the second command meets the first condition comprises:
a value of a specified part of the second command equals to a fifth preset value;
determining whether there is a certificate required to be authenticated comprises:
there is not a certification required to be authenticated if a value of a fifth bit of a first byte of the second command is a ninth preset value; there is a certificate required to be authenticated if the value of the fifth bit of the first byte of the second command is not the ninth preset value.

7. The method of claim 1, wherein
before decrypting the fourth command via the public key referenced by the RSA public key reference, the method further comprises:
determining whether a length of a data field of the fourth command equals to a modular length of the public key referenced by the RSA public key reference, decrypting the fourth command with the public key referenced by the RSA public key reference if the length of the data field of the fourth command equals to the modular length of the public key referenced by the RSA public key reference; otherwise, reporting an error and going back to S3;
after storing the safe level and before establishing the session key, the method further comprises:
determining whether the session key can be established, establishing session key if the session key can be established; otherwise, reporting an error and going back to S3.

8. The method of claim 7, wherein determining whether the session key can be established comprises:
determining whether a condition that a value of a general tag of a control reference template equals to a seventh preset value, and there is a first TLV structure and a second TLV structure, the length of which equals to a first preset length, in the control reference template is met, the session key can be established if the condition is met; the session key cannot be established if the condition is not met; wherein the seventh preset value is a first tag or a second tag;
establishing the session key comprises:
in the case that the value of the general tag of the control reference template is a first tag,
if a Value in the TLV structure with a TAG being 95 is a first value, establishing a first session key;
if the Value in the TLV structure with the TAG being 95 is a second value, establishing a second session key; and
if the Value in the TLV structure with the TAG being 95 is a third value, establishing the first session key and the second session key;
in the case that the value of the general tag of the control reference template is a second tag,
if the Value in the TLV structure with the TAG being 95 is a first value, establishing a third session key;
if the Value in the TLV structure with the TAG being 95 is a second value, establishing a fourth session key;
if the Value in the TLV structure with the TAG being 95 is a third value, establishing the third session key and the fourth session key; and
if the Value in the TLV structure with the TAG being 95 is a fourth value, establishing a fifth session key;

after storing the session key and before setting signature information, the method further comprises:

determining whether the signature information is required to be set, setting signature if the signature information is required to be set; reporting an error and going back to S2 if the signature information is not required to be set.

9. The method of claim 8, wherein determining whether the session key can be established comprises:

determining whether the condition that the value of the general tag of the control reference template equals to the seventh preset value and there is the first TLV structure and the second TLV structure, the length of which equals to the first preset length, in the control reference template is met, the session key can be established if the condition is met; otherwise, the session key can not be established;

determining whether the signature information is required to be set comprises:

determining whether there is a third TLV structure in the control reference template, wherein a value of TAG of third TLV structure equals to an eighth preset value and a length of TAG of third TLV structure equals to an second preset length; the signature information being required to be set if there is a third TLV structure in the control reference template; otherwise, the signature information not being required to be set.

10. The method of claim 1, wherein S4-S7 are replaced by S4'-S7',

S4', reporting an error and going back to S2;

S5', determining whether a condition that the security environment management identifier is not set and the authentication identifier of the certificate is set is met, reporting an error if the condition is met, going back to S2; otherwise, generating a first random number, storing the first random number and sending the first random number to an external device of the smart card and setting an obtaining random number identifier, going back to S3;

S6', determining whether a condition that the obtaining random number identifier is set, and a decryption result obtained by decrypting the data field of the sixth command with the public key referenced by the RSA public key reference is successfully authenticated is met, reporting an error and going back to S2 if the condition is not met; if the condition is met, obtaining a safe level from the decryption result and generating card confidential data, determining whether a control reference template of the decryption result meets a preset requirement, obtaining and storing confidential data of the external device of the smart card if the control reference template meets the preset requirement, generating a session key according to the card confidential data and the confidential data of the external device, generating signature information according to a specified byte of the confidential data of the external device and a specified byte of the card confidential data, setting a session key establishment identifier and setting an obtaining random number identifier; reporting an error and going back to S2 if the control reference template does not meet the preset requirement; and S7', obtaining the second random number from the seventh command, storing the second random number and determining whether a condition that the session key establishment identifier is set and the obtaining random number identifier is set is met, going back to S2 if the condition is not met; if the condition is met, obtaining a data field of the seventh command from the seventh command, constructing a third data block containing the card confidential data and the data field of the seventh command, performing operation on the third data block via the first algorithm to obtain an operation result, wherein the operation result is a second calculation result; constructing a fourth data block containing the card confidential data and the second calculation result; encrypting the fourth block via the private key referenced by the RSA private key reference to obtain an encryption result, wherein the encryption result is a first signature result; sending the first signature result to the external device of the smart card, setting the mutual authentication identifier, clearing the first random number and the second random number, going back to S3.

11. The method of claim 10, wherein generating a session key according to the card confidential data and the confidential data of the external device comprises performing an exclusive OR operation on the confidential data of the external device and the card confidential data to obtain an exclusive OR operation result; setting a corresponding counting number according to a type of the session key required to be generated, splicing the exclusive operation result and the counting number orderly, performing an operation on an splicing result via a first algorithm to obtain a third calculation result, obtaining a preset byte data from the third calculation result and storing the preset byte data as the session key.

* * * * *